United States Patent [19]

Minagawa

[11] Patent Number: 5,207,122
[45] Date of Patent: May 4, 1993

[54] CLUTCH-TO-CLUTCH SHIFTING IN AUTOMATIC TRANSMISSION

[75] Inventor: Yusuke Minagawa, Yokohama, Japan

[73] Assignee: Nissan Motor Co., Ltd., Yokohama, Japan

[21] Appl. No.: 694,313

[22] Filed: May 1, 1991

[30] Foreign Application Priority Data

May 1, 1990 [JP] Japan ................................ 2-111793
Jan. 25, 1991 [JP] Japan ................................ 3-23903

[51] Int. Cl.$^5$ ............................................. B60K 41/06
[52] U.S. Cl. .................................... 74/866; 74/867
[58] Field of Search ...................... 74/861, 866, 867

[56] References Cited

U.S. PATENT DOCUMENTS

| | | | |
|---|---|---|---|
| 4,667,540 | 5/1987 | Yagi | 74/866 |
| 4,671,139 | 6/1987 | Downs et al. | 74/861 X |
| 4,707,789 | 11/1987 | Downs et al. | 74/867 X |
| 4,730,521 | 3/1988 | Hayasaki et al. | 74/867 |
| 4,984,483 | 1/1991 | Hiramatsu et al. | 74/867 X |
| 5,036,729 | 8/1991 | Nitz et al. | 74/866 |

FOREIGN PATENT DOCUMENTS 0214467 3/1987 European Pat. Off. .

OTHER PUBLICATIONS

Nissan Full-Range Electronically Controlled Automatic Transmission (A261C07) Service Manual (Mar. 1987).
Leising et al., "The All-Adaptive Controls for the Chrysler Ultradrive Transaxle", SAE Paper 890529, pp. 45-53. No date provided.
Leising et al, "Adaptive Control Strategies for Clutch--to-Clutch Shifting", SAE Paper 905048, pp. 331-341. No date provided.

*Primary Examiner*—Richard M. Lorence
*Assistant Examiner*—Benjamin Levi
*Attorney, Agent, or Firm*—Foley & Lardner

[57] ABSTRACT

According to a shift control, a release element is released in such a manner as to allow an increase in the input shaft speed within a predetermined degree for a period of time, and subsequently an apply element is engaged during the period of time.

8 Claims, 9 Drawing Sheets

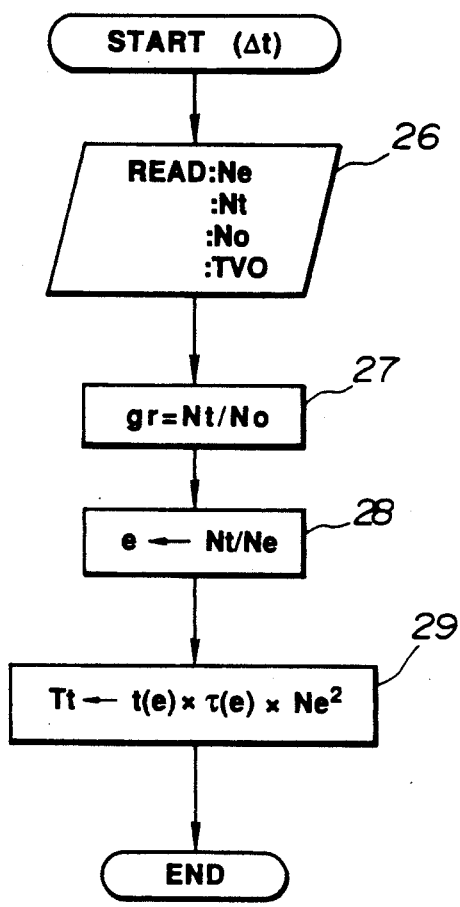
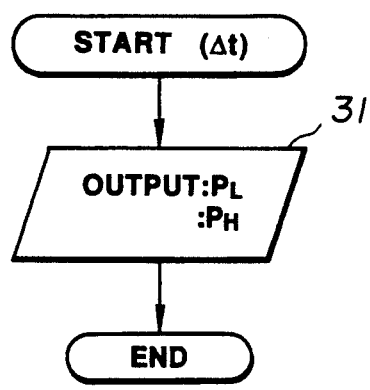
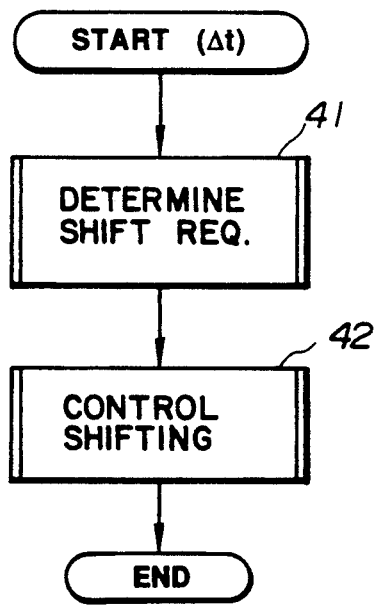

CLUTCH-TO-CLUTCH SHIFTING IN AUTOMATIC TRANSMISSION

BACKGROUND OF THE INVENTION

The present invention relates to a method of and a system for a shift control in an automatic transmission drivingly coupled with an engine with a load control member.

U.S. Pat. No. 4,730,521 issued to Hayasaki et al. on Mar. 15, 1988 and European Patent Application published under publication No. 0214467 on Oct. 19, 1988 disclose an automatic transmission including a forward one-way clutch and a low one-way clutch. In the known automatic transmission, the one-way clutch overruns to effect a smooth shockless shift. The provision of the one-way clutches has made contribution to simplification of an engagement control of an on-coming or an apply friction element. However, the provision of such one-way clutches are obstacles to making the automatic transmissions compact. In order to remove the one-way clutches, SAE papers 890529 and 905048 propose an adaptive control for clutch-to-clutch shifting.

An object of the present invention is to provide an improved method of and system for a shift control in an automatic transmission such that a shift quality is improved considerably by preventing occurrence of engine racing while providing increased freedom in selecting initiation timing of engagement of an on-going or apply friction element.

SUMMARY OF THE INVENTION

According to the present invention, there is provided a method of a shift control in an automatic transmission drivingly coupled with an engine, the automatic transmission including an input shaft drivingly coupled with the engine, an apply element, and a release element, the automatic transmission effecting shifting by releasing the release element and engaging the apply element, the method comprising the steps of releasing the release element in such a manner as to allow an increase in the engine speed within a predetermined degree for a period of time; and engaging the apply element during said period of time.

According to another aspect of the present invention, there is provided a system for a shift control in an automatic transmission drivingly coupled with an engine, the automatic transmission including an input shaft drivingly coupled with the engine, an apply element, and a release element, the automatic transmission effecting shifting by releasing the release element and engaging the apply element, the system comprising means for determining an operating variable of the automatic transmission related to the shifting in the automatic transmission; and means for releasing the release element in response to said operating variable in such a manner as to allow an increase in the engine speed within a predetermined degree for a period of time, and engaging the apply element during said period of time.

BRIEF DESCRIPTION OF THE DRAWINGS

FIGS. 3, 4, 5, and 6 are flow charts employed in a first embodiment according to the present invention;

DETAILED DESCRIPTION OF THE INVENTION

Figure 1:
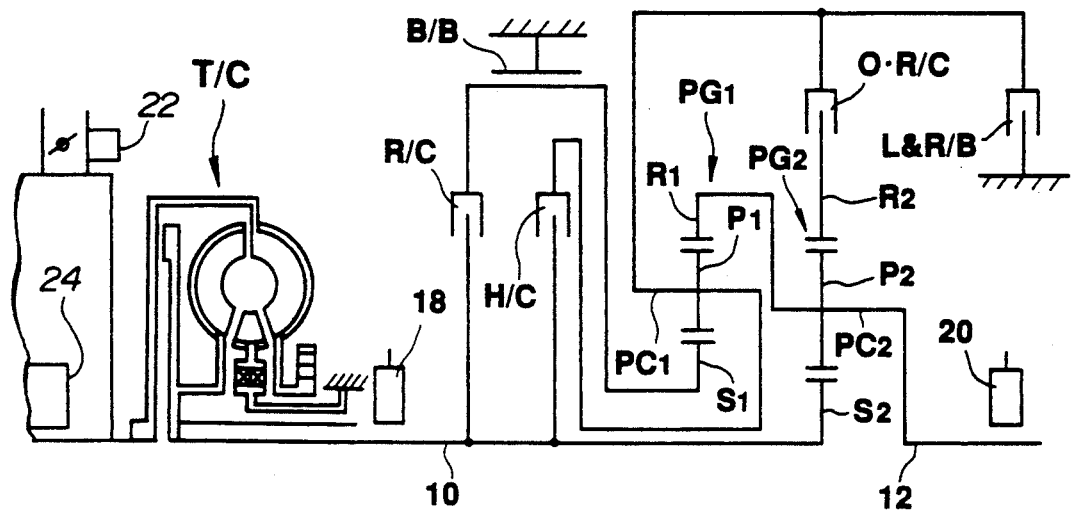
FIG. 1 is a schematic view of an automatic transmission drivingly coupled with an engine via a torque converter.

Referring to FIG. 1, an automatic transmission has an input shaft (a turbine shaft) 10 drivingly coupled via a torque converter T/C to an engine having a load control member in the form of a throttle valve which opens in degrees. The automatic transmission has an output shaft 12, a first planetary gear set $PG_1$ and a second planetary gear set $PG_2$.

The first planetary gear set $PG_1$ includes a sun gear $S_1$, a pinion carrier $PC_1$ rotatably supporting a plurality of pinions $P_1$ meshing the sun gear $S_1$, and a ring gear $R_1$ meshing the pinions $P_1$. The second planetary gear $PG_2$ includes a sun gear $S_2$ rotatable with the input shaft 10, a pinion carrier $PC_2$ rotatably supporting a plurality of pinions $P_2$ meshing the sun gear $S_2$, and a ring gear $R_2$ meshing the plurality of pinions $P_2$. The pinion carrier $PC_2$ is rotatable with both the ring gear $R_1$ and the output shaft 12. A band brake B/B is provided to hold the sun gear $S_1$ stationary. A reverse clutch R/C is operatively disposed between the input shaft 10 and the sun gear $S_1$ to selectively establish a drive connection therebetween. A high clutch H/C is operatively disposed between the input shaft 10 and the pinion carrier $PC_1$ to selectively establish a drive connection therebetween. An overrunning clutch O R/C is operatively disposed between the pinion carrier $PC_1$ and the ring gear $R_2$ to selectively establish a drive connection therebetween. A low reverse brake L&R/B is provided to hold the pinion carrier $PC_1$ stationary.

This automatic transmission provides four forward gears or speeds and one reverse gear or speed. For the first gear, the overrunning clutch O R/C and low reverse brake L&R/B are both engaged. A 1-2 upshift is effected by releasing the low reverse brake L&R/B and engaging the band brake B/B. A 2-3 upshift is effected by releasing the band brake B/B and engaging the high clutch H/C. A 3-4 upshift is effected by releasing the overrunning clutch O R/C and engaging the band brake B/B. The reverse R/C and low reverse brake L&R/B are both engaged for the reverse gear drive.

Figure 2:
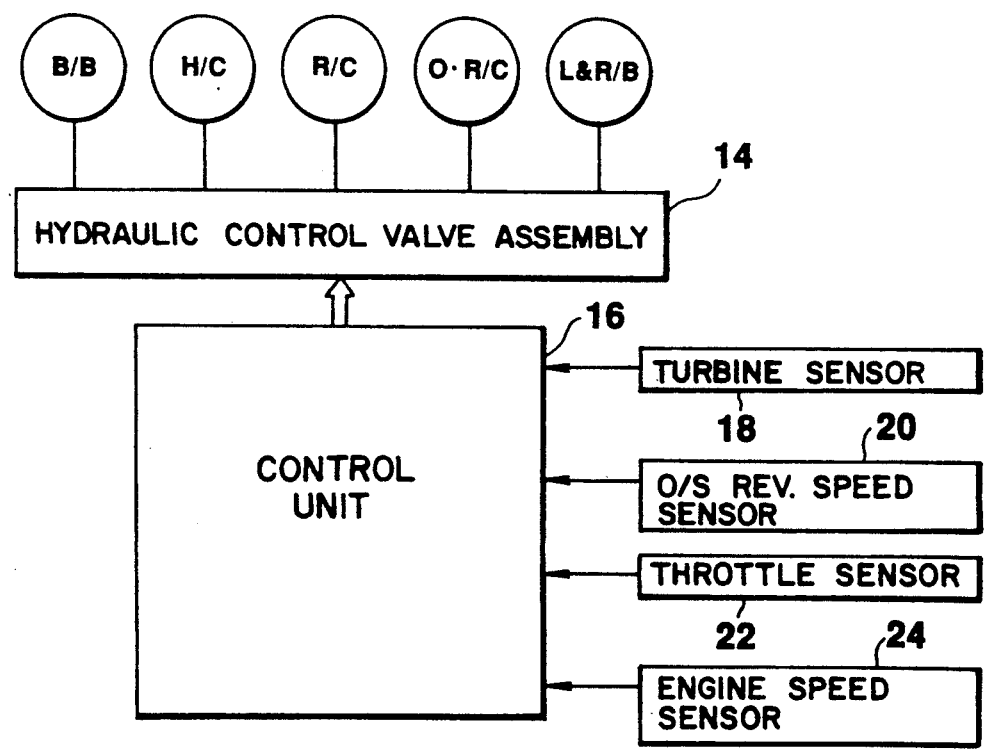
FIG. 2 is a block diagram of a control arrangement including a hydraulic control valve assembly with various friction elements, and a control unit with various sensors.

Referring to FIG. 2, the release and engagement of the above-mentioned friction elements are hydraulically controlled by a hydraulic control valve assembly 14 which is operatively connected with a control unit 16.

A turbine sensor 18 is provided to detect a revolution speed of the input shaft 10 and generate an input shaft revolution speed indicative signal indicative of the input shaft revolution speed detected. An output shaft revolution speed sensor 20 is provided to detect a revolution speed of the output shaft 12 and generate an output shaft revolution speed indicative signal indicative of the output shaft revolution speed detected. A throttle opening degree sensor 22 is provided to detect a throttle opening degree of the engine and generate a throttle opening degree indicative signal indicative of the throttle opening degree detected. An engine revolution speed sensor 24 is provided to detect a revolution speed of the engine and generate an engine revolution speed indicative signal indicative of the engine revolution speed detected. The sensor outputs of the above-mentioned sensors 18, 20, 22, and 24 are supplied to the control unit 16.

The control unit 16 is a microcomputer based control unit which is similar to that used in a known automatic transmission of the RE4R01A type which is described in a service manual "NISSAN FULL-RANGE ELECTRONICALLY CONTROLLED AUTOMATIC TRANSMISSION (A261C07)" published in March 1987. Reference should be made to this service manual in full understanding of the previously mentioned components of the automatic transmission used in this embodiment.

An upshift is described taking a 1-2 upshift as an example. In the previously described gear train, the 1-2 upshift is effected by releasing the low reverse brake L&R/B and applying the band brake B/B. In the following description, the low reverse brake L&R/B is called as a release element, while the band brake B/B as an apply element.

FIG. 3 is a flow chart wherein information necessary for the upshift control is determined by reading operations or calculations. Execution of this flow is repeated upon expiration of a predetermined period of time t (delta t), for example 10 msec. At a step 26, reading operations of output signals of sensors 18, 20, 22 and 24 are performed and the results are stored as an input shaft revolution speed (a turbine shaft revolution speed) Nt, an output shaft revolution speed No. a throttle opening degree TVO, and an engine revolution speed Ne. At the subsequent steps 27 and 28, a ratio Nt/No is calculated and the result is stored as a gear ratio $g_r$, and a ratio of Nt/Ne is calculated and the result is stored as a torque converter speed ratio e. After the step 28, table look-up operations of a torque ratio characteristic curve and a torque capacity coefficient characteristic curve of the torque converter T/C are performed based on the torque converter speed ratio e. The results are stored as a torque ratio t(e) and a torque capacity coefficient $\tau(e)$ (tau e). An input shaft torque Tt is given by calculating the following equation.

$$Tt = t(e) \times \tau(e) \times Ne^2.$$

FIG. 4 is a flow chart of an output program of a pressure value $P_L$ for the release element L&R/B and a pressure value $P_H$ for the apply element B/B. Execution of this program is repeated upon expiration of a predetermined period of time Δt (delta t).

FIG. 5 is a flow chart of a shift control program for determining the above mentioned pressures $P_L$ and $P_H$. Execution of this program is repeated upon expiration of a predetermined period of time Δt (delta t). At a step 41, a determination is made whether or not a shift is required. Specifically, a table look-up operation of a stored shift point mapping is made based on throttle opening degree TVO and output shaft revolution speed No to determine a desired gear position, a comparision is made between a present gear position and the desired gear position, and if the present gear position is not equal to the desired gear position, a determination is made what type of shift is required and a shift command for such a shift required is issued. At the subsequent step 42, a release element and an apply element for the shift required are determined and a appropriate control program is selected and executed for determining hydraulic pressures for these release and apply elements, respectively. If 1-2 upshift is required, the release element is the low reverse brake L&R/B and the apply element the band brake B/B, and execution of a program shown in FIG. 6 is initiated.

Figure 6:
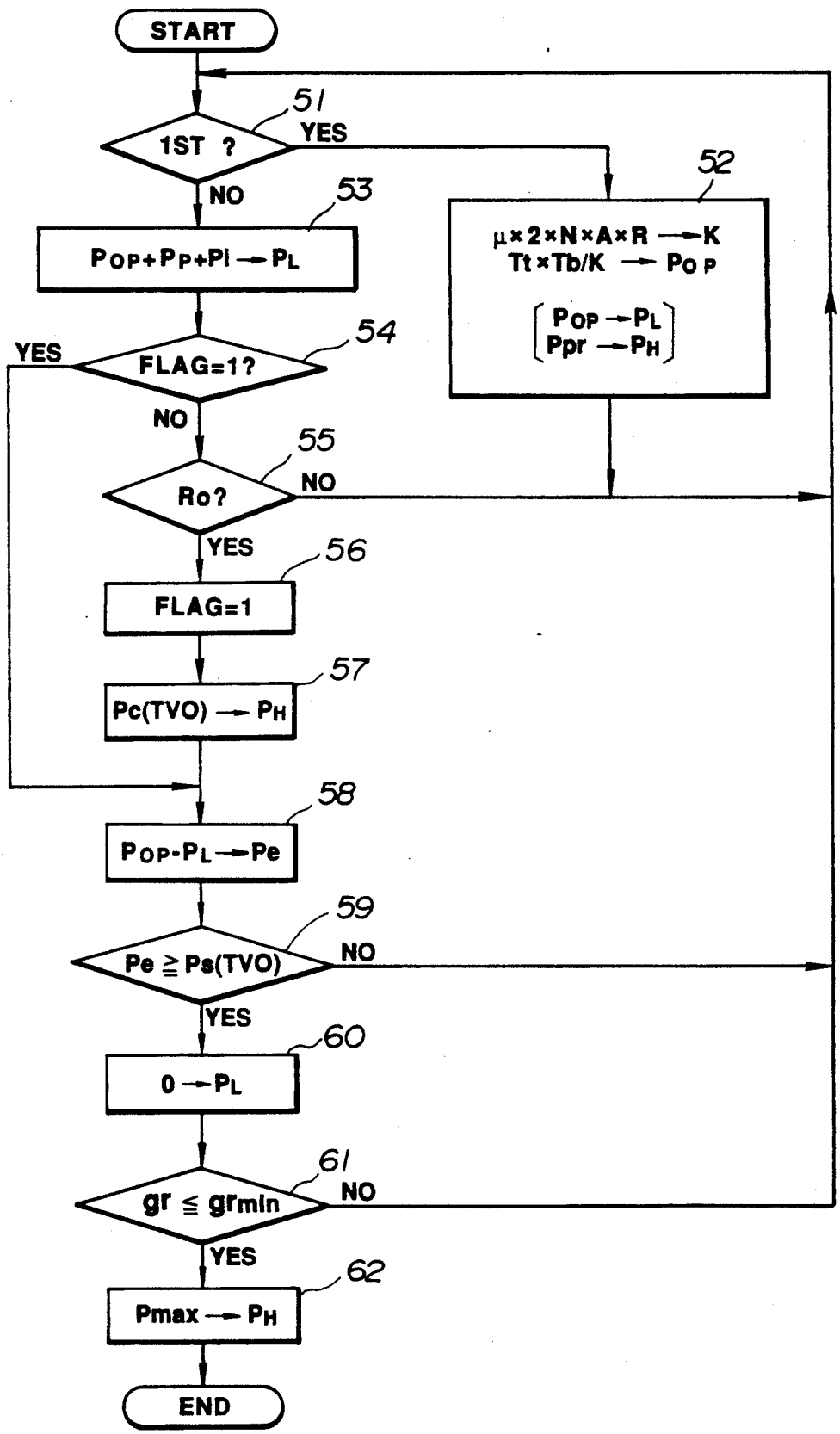
Figure 7:
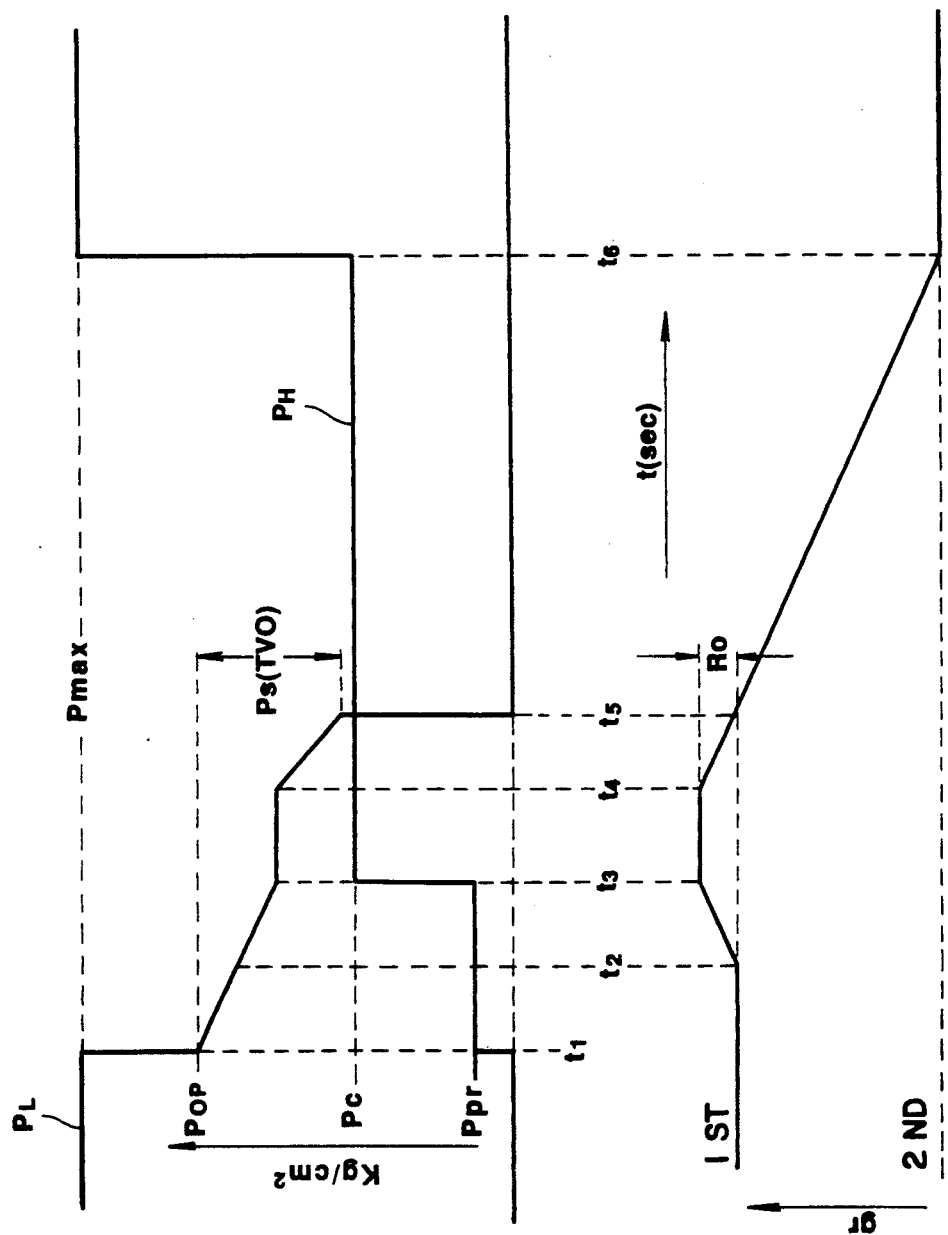
FIG. 7 is a timing chart for the first embodiment.

The program shown in FIG. 6 is explained in connection with a time chart shown in FIG. 7. Execution of this program is initiated at a momenet $t_1$ (see FIG. 7) upon issuance of a shift command for 1-2 upshift. At a step 51, it is determined whether or not the present cycle is the first occurrence. If the inquiry at this step 51 results in affirmative, the program proceeds to a step 52 where a required pressure Pop for the release element L&R/B and a pre-shelf pressure Ppr for the apply element B/B are calculated. Since it is skipped during the subsequent cycles, the step 52 is executed only once upon or immediately after the moment $t_1$. Prior to calculating the pressure Pop, a coefficient k as expressed by $\mu \times 2 \times N \times A \times R$ is given, where $\mu$ is a frictional coefficient of the release element L&R/B, N a number of friction plates, A a frictional area of each of the plates, and R an average effective radius. Using this coefficient, the pressure Pop is expressed and thus given by the following equation, $$Pop = Tt \times Tb/k$$

where, Tb: a torque bearing rate of the release element L&R/B.

The setting is such that the pre-shelf pressure Ppr develops a force opposed to a return spring of the apply element B/B to minimize a lost stroke of a servo piston. Thus, the force developed by the pre-shelf pressure Ppr is substantially the same as a force developed by the return spring, and the apply element B/B is held at a disengaged position about to engage. The pressures Pop and Ppr are stored at $P_L$ and $P_H$.

In the second cycle and onwards (after the moment $t_1$ in FIG. 7), the program proceeds from the step 51 to a step 53 where $P_L$ is modified by adding a proportional term $P_p$ and an integral term Pi to Pop. In this feedback control, a variable under control is the gear ratio $g_r$ or the input shaft revolution speed Nt and an actual value of the variable approaches toward a first target value which is increased by a predetermined value Ro from the actual value at the moment $t_1$ upon issuance of the shift command (see FIG. 7). In this embodiment, the gear ratio $g_r$ is used as the variable under the feedback control. Therefore, the pressure $P_L$ in the release element L&R/B decreases. In FIG. 7, after the moment $t_1$ and before the subsequent moment $t_2$, the release element L&R/B is held engaged. At the moment $t_2$, the release element L&R/B no longer develops sufficient force to hold the actual value of the gear ratio and allows the speed of the turbine shaft 10 to increase. Owing to this increase, the gear ratio begins to increase toward the first target value since the pressure $P_H$ in the apply element B/B is kept at the pre-shelf pressure Ppr. After the moment $t_2$ until a moment $t_3$, a loop formed by steps 51, 53, 54 and 55 is repeated and thus the pressure $P_L$ in the release element L&R/B continues to decrease.

At the moment $t_3$, the program proceeds from the step 55 to steps 56 and 57 once and in the subsequent cycles, the steps 55, 56 and 57 are skipped since the flag FLAG is set to 1 at the step 56. At the moment $t_3$, the pressure $P_H$ in the apply element B/B increases toward a shelf pressure Pc which is dependent on the throttle opening degree TVO. Although in this embodiment, the gear ratio $g_r$ reaches the first target value at the moment t$_3$. If desired, a second target value which is different from the first target value may be set and the moment t$_3$, at which the shelf pressure Pc is set as the pressure P$_H$ for the apply element B/B, may be defined as a moment when the gear ratio reaches the second target value.

After the moment t$_3$, since the execution of the step 53 is repeated, the pressure P$_L$ for the release element L&R/B is controlled to keep the gear ratio g$_r$ in such a manner as to prevent an increase in gear ratio by the predetermined value Ro. With the pressure P$_L$ kept at the shelf pressure Pc, the apply element B/B engages and develops a sufficient force to initiate input shaft revolution speed (Nt) drop and gear ratio (g$_r$) change at a moment t$_4$. This causes the pressure P$_L$ in the release element L&R/B to drop again. At a step 58, a deviation Pe resulting from subtracting P$_L$ from Pop is calculated, and the deviation Pe is compared with a predetermined value Ps (TVO) which is dependent on the throttle opening degree TVO. Between the moment t$_4$ and a moment t$_5$ when the deviation Pe becomes greater than or equal to the predetermined value Ps(TVO), the program returns to the step 53 from the step 59 so that the pressure P$_L$ continues to decrease.

At the moment t$_5$, the program proceeds from the step 59 to a step 60 where the pressure P$_L$ is set equal to zero (0) to completely discharge hydraulic fluid from the release element L&R/B. In this embodiment, the pressure P$_L$ changes to zero to release the release element L&R/B without any delay. If desired, this release process may proceed at a gradual rate. Since the pressure P$_H$ in the apply element B/B is held at the shelf pressure Pc, the engagement of the apply element B/B continues to progress and thus the gear ratio g$_r$ changes toward a gear ratio g$_{rmin}$ corresponding to the second gear or speed. At a moment t$_6$ when g$_r$ becomes equal to or less than g$_{rmin}$, the program proceeds from a step 61 to a step 62 where the pressure P$_H$ for the apply element B/B is set equal to the maximum value Pmax. Thus, the apply element B/B is firmly engaged after completion of shifting.

From the preceding description of the first embodiment, it will be appreciated that the degree of increase in the gear ratio g$_r$ after releasing the release element is held below the predetermined value Ro, and the apply element is subject to the shelf pressure Pc and starts to develop sufficient force to drop the gear ratio when the gear ratio g$_r$ is increased by the predetermined value Ro, so that an improved shifting without any engine racing and torque drop is accomplished.

Besides, an one-way clutch is not required, making much contribuation to making automatic transmissions compact.

A second embodiment is now described.

Figure 8:
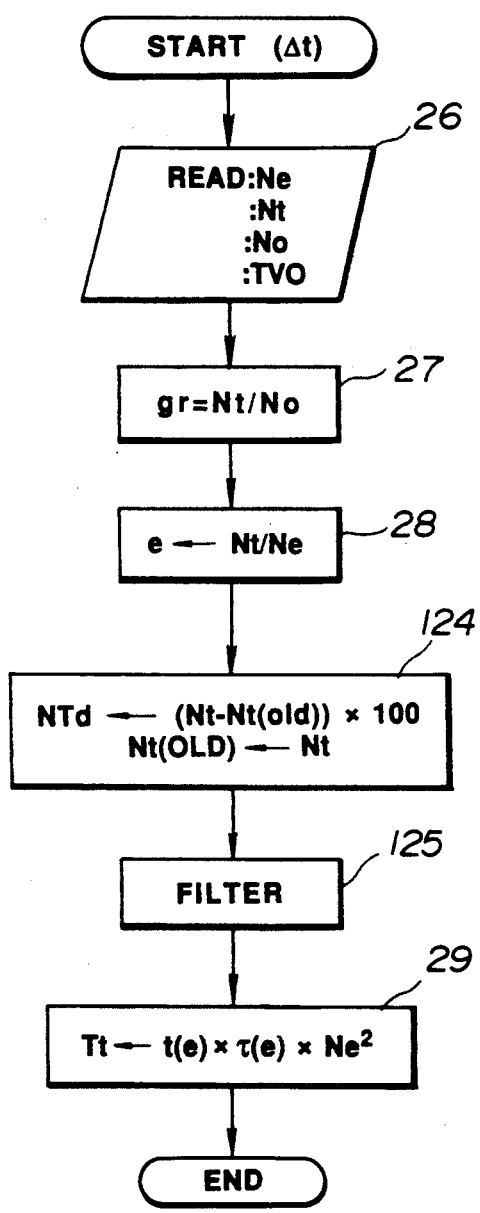
FIGS. 8, 9, 10, 11, and 12 are flow charts employed in a second embodiment according to the present invention.
Figure 9:
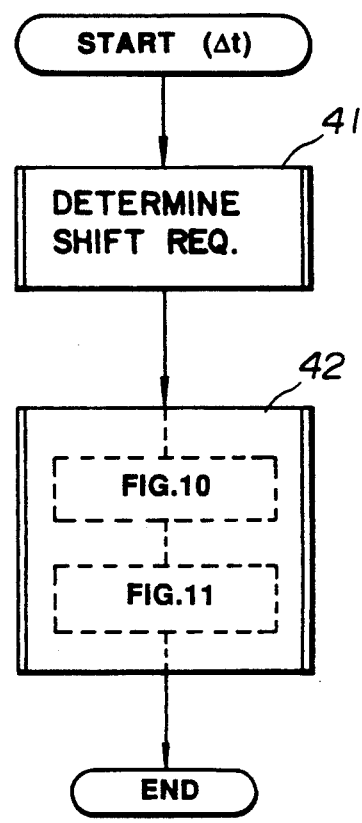

In this second embodiment, the gear train used in the first embodiment is also used. Referring to FIGS. 8 and 9, FIG. 8 corresponds to FIG. 3, and FIG. 9 corresponds to FIG. 5. The program illustrated by the flow chart of FIG. 4 is used in this embodiment, too.

FIG. 8 is substantially the same as FIG. 3 except for the insertion of two steps 124 and 125 between steps 28 and 29. At step 124, the input shaft revolution speed data Nt stored in the present cycle is stored as an old input shaft revolution speed data Nt(OLD), and a rate of change of input shaft revolution speed or a derivative, with respect to time, of input shaft revolution speed NTd is given by calculating the following equation, $$NTd = (Nt - Nt(OLD)) \times 100.$$

At the subsequent step 125, a filtering process of the derivative NTd is conducted to eliminate cycle-to-cycle variability.

FIG. 9 is substantially the same as FIG. 5 except that there are a torque phase control and an inertia phase control in a step 42. The torque phase control is illustrated by a flow chart shown in FIG. 10, while the inertia phase control by a flow chart shown in FIG. 11. A 1-2 upshift is exemplified in the following description of the torque phase control shown in FIG. 10 and the inertia phase control shown in FIG. 11.

Figure 10:
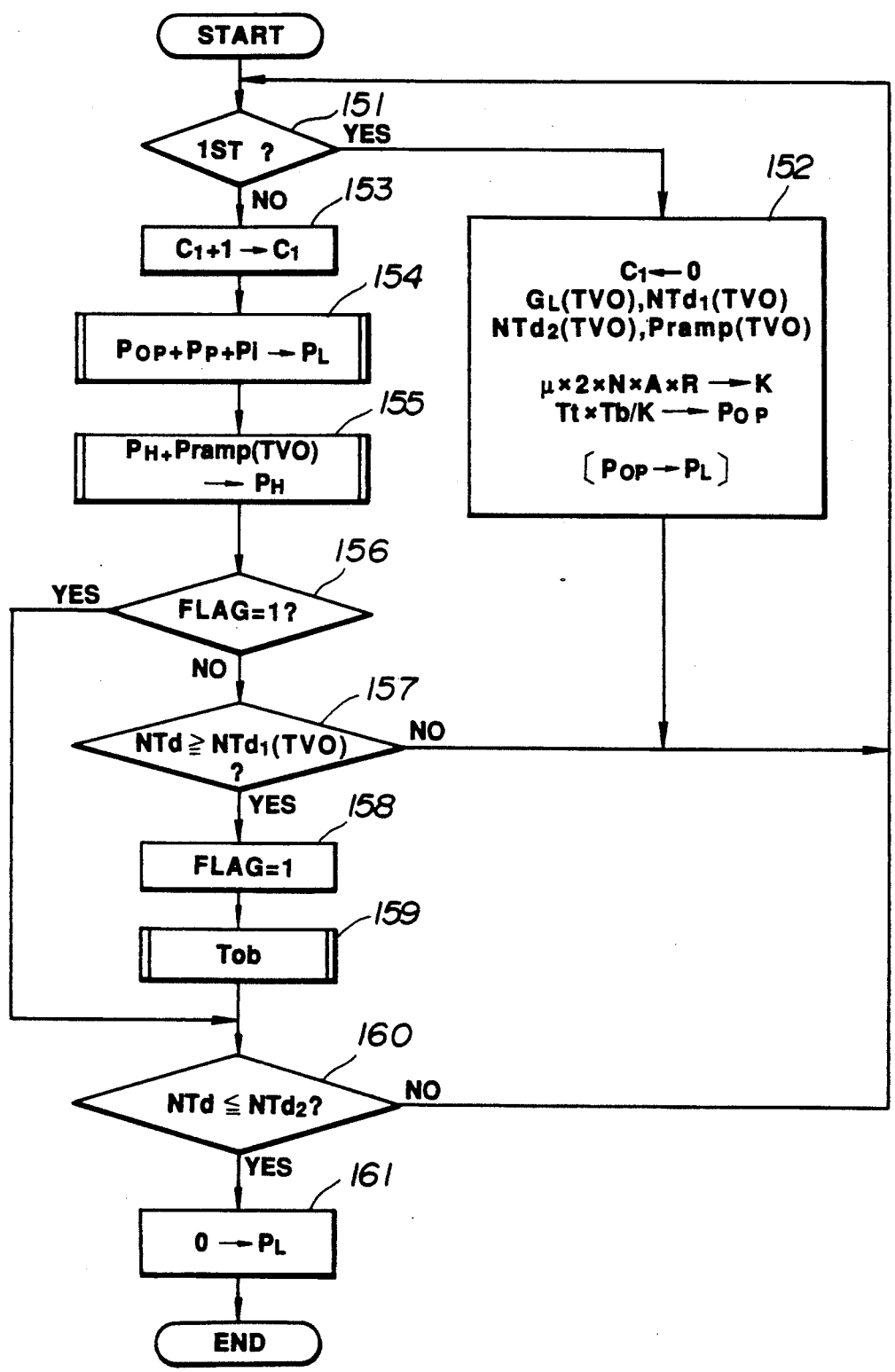

Referring to FIG. 10, execution of this program is initiated at a moment t$_{11}$ (see FIG. 13) upon issuance of a command for a 1-2 upshift. In FIG. 10, if at a step 151 it is determined that the present cycle is the first occurrence, the program proceeds from the step 151 to a step 152. At the step 152, a pressure Pop is calculated and set as a pressure P$_L$ in the same manner as in the step 52 of FIG. 6. In addition, a first counter C$_1$ is reset and reading operations of various variables are performed. The variables are dependent on the throttle opening degree TVO stored at the moment t$_{11}$ and include a release element feedback gain G$_L$ (TVO), a predetermined target value NTd$_1$ (TVO) of the first derivative NTd of the input shaft revolution speed, a feedback termination value NTd$_2$ (TVO) at which the feedback control is to end, and an apply element ramp value Pramp(TVO).

Figure 13:
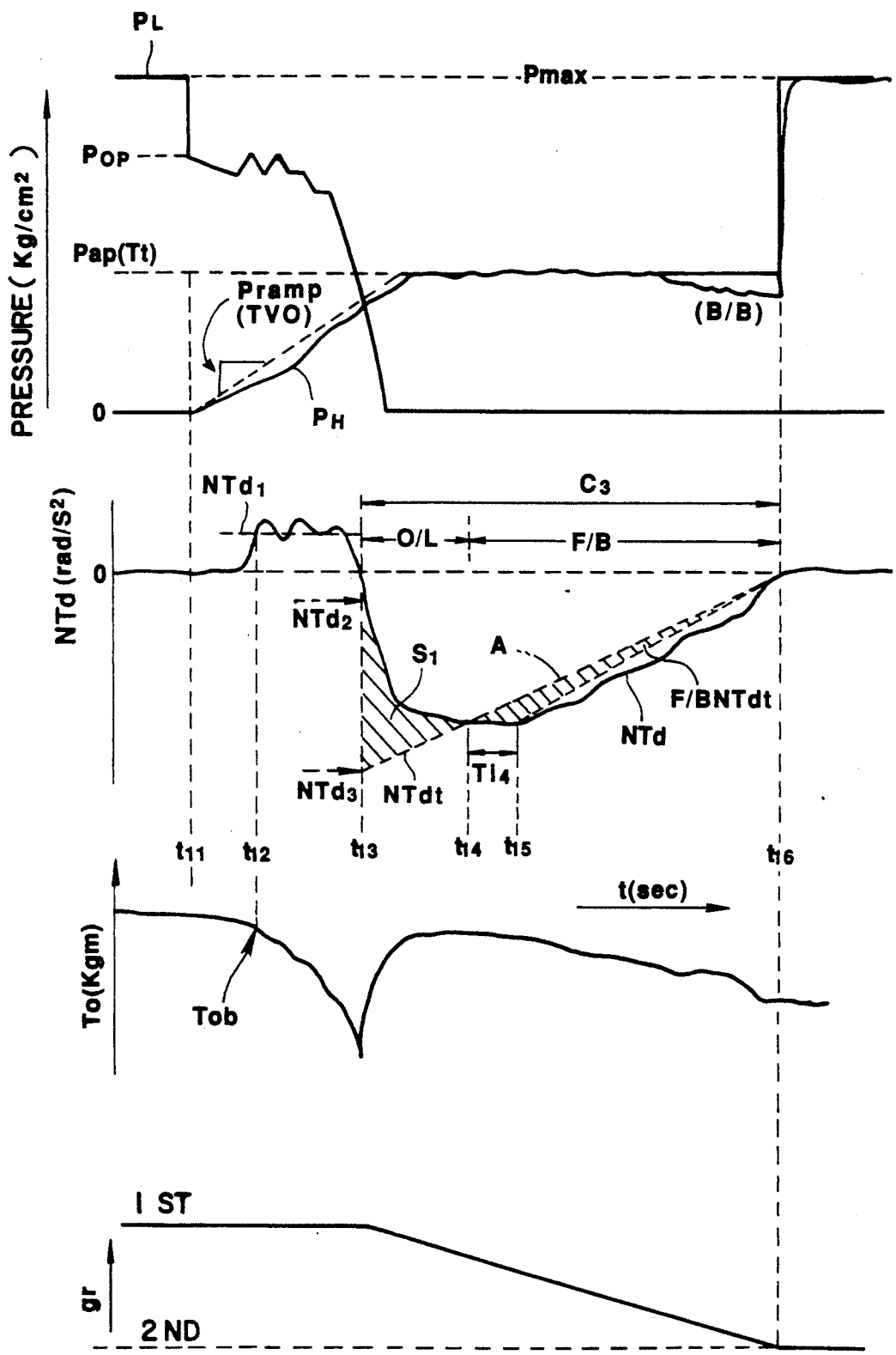
FIG. 13 is a timing chart for the second embodiment.

In each of the second and the subsequent cycles, the first counter C$_1$ is incremented by one at a step 153. At steps 154 and 155, the pressure P$_L$ for the release element L&R/B and pressure P$_H$ for the apply element B/B are determined, respectively. At the step 154, a PI control is performed based on a deviation of NTd from the predetermined target value NTd$_1$ such that the pressure P$_L$ for the release element L&R/B gradually decreases in such a manner as to decrease the deviation toward zero. At the step 155, the pressure P$_H$ for the apply element B/B is incremented by the ramp value Pramp which has been set at the step 152 in a direction toward a shelf pressure Pap(Tt) as illustrated in FIG. 13. The shelf pressure Pap(Tt) is dependent on the input shaft (turbine) torque Tt. Referring to FIG. 13, the pressure P$_L$ in the release element L&R/B drops to Pop immediately after the moment t$_{11}$ and thereafter gradually decreases, while the pressure P$_H$ in the apply element B/B starts increasing at the rate of the ramp value Pramp(TVO) immediately after the moment t$_{11}$.

A loop formed by the steps 151, 153, 154, 155 and 157 is repeated until NTd reaches the predetermined target value NTd$_1$. At a moment t$_{12}$ when it is determined at the step 157 that NTd becomes equal to or greater than the predetermined target value NTd$_1$, the program proceeds through steps 158 and 159 once. At the step 158, the flag FLAG is set to 1 and at the step 159, an output shaft torque before shifting Tob is calculated using the input shaft torque Tt and the derivative of input shaft revolution speed NTd. This value Tob is used in a step 173 of the interia phase control shown in FIG. 11 and used for conducting a smooth shift into the inertia phase control.

After the moment t$_{12}$, the steps 157, 158 and 159 are skipped and the program proceeds from the step 156 directly to a step 160 where a determination is made whether or not NTd is equal to or less than NTd$_2$. As long as the inquiry at the step 160 is negative, the step 154 is executed and the pressure $P_L$ in the release element L&R/B is controlled in such a manner as to bring NTd into agreement with the predetermined target value $NTd_1$. Thus, during this process, a small degree of engine race or increase is maintained, while the pressure $P_H$ in the apply element B/B continues to increase at the ramp value Pramp. Thus, the derivative NTd drops and changes to a negative due to a drop in the input shaft revolution speed Nt. At a moment $t_{13}$ when the derivative NTd drops and reaches the feedback (F/B) termination value $NTd_2$, the inquiry at the step 160 results in affirmative. Then, at a step 161, the pressure $P_L$ for the release element L&R/B is set equal to zero. Thus, the feedback control using the derivative NTd is terminated, and the release element L&R/B is released immediately. If desired, the release process of the release element L&R/B may progress at a gradual rate.

Figure 11:
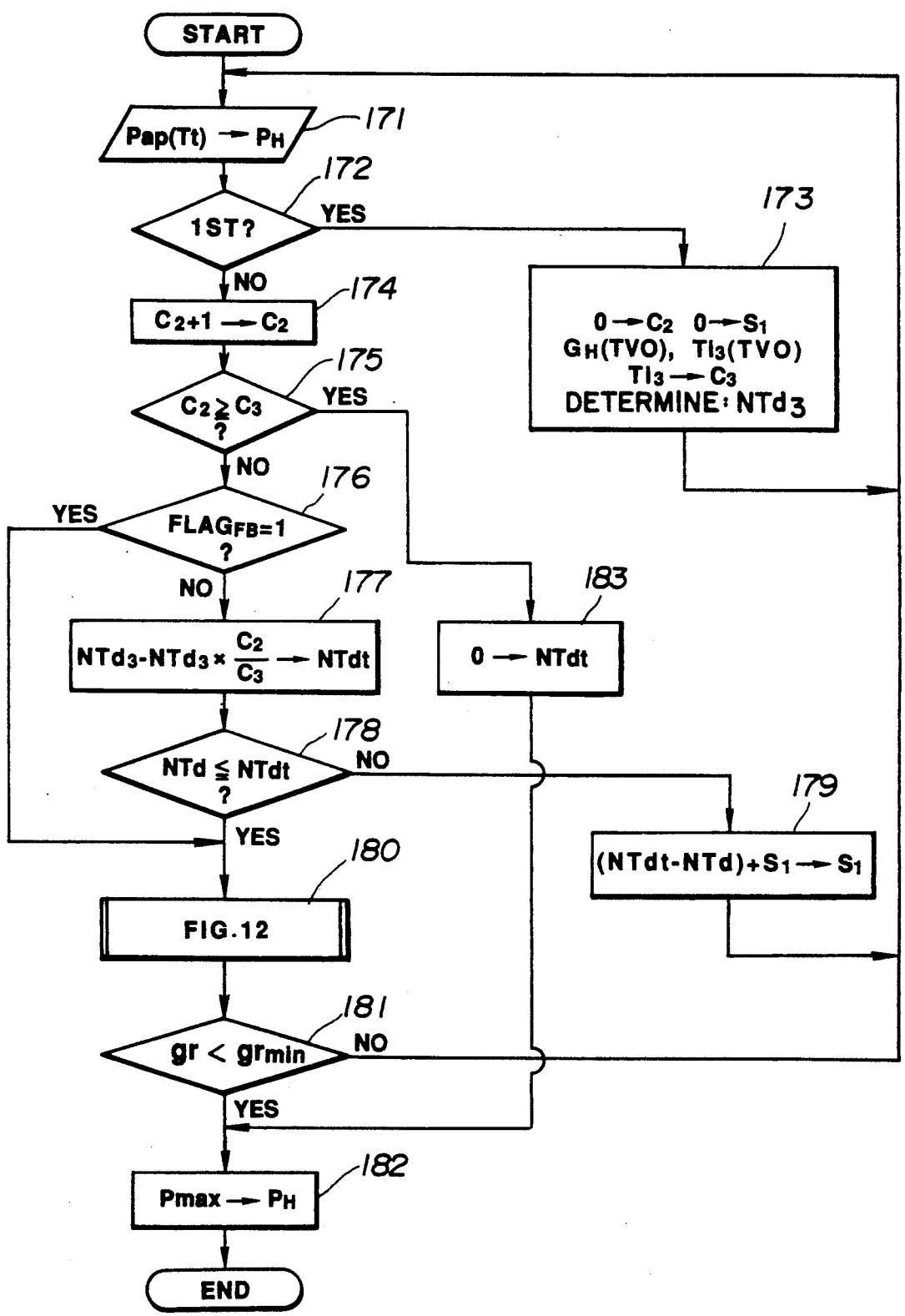

The inertia phase control is explained in connection with FIG. 11. Between the moments $t_{13}$ and $t_{14}$, an open loop (O/L) control is conducted using the shelf pressure Pap(Tt) as a target value, and then a feedback control is conducted. In FIG. 11, if it is determined at a step 172 that the present cycle is the first occurrence, a step 173 is executed once. At the step 173, a second counter $C_2$ is reset, an integrated value $S_1$ is set equal to zero, a feedback gain $G_H(TVO)$ which depends on the throttle opening degree TVO is read, and a timer value $T_{i3}(TVO)$ which depends on the throttle opening degree TVO is read and set as content of a third counter $C_3$. The setting is such that $T_{i3}(TVO)$ represents the maximum period of time which is allowed till completion of control of the apply element pressure. Besides, at the step 173, the output shaft torque before shifting Tob (calculated at the step 159) and the derivative NTd are used to calculate an initial derivative, with respect to time, of input shaft revolution speed $NTd_3$ in order to make a smooth shift in torque.

In the subsequent cycles, the program proceeds from the step 172 to a step 174 and onwards. At the step 174, the second counter $C_2$ is incremented. Thus, the counter $C_2$ functions to measure time elapsed from the moment $t_{13}$. At a step 175, the counter $C_2$ is compared with the counter $C_3$ which represents the maximum period of time allowed as readily understood from FIG. 13. If $C_2$ is less than $C_3$, the program proceeds to a step 175 where it is determined whether or not a flag $FLAG_{FB}$ is set equal to 1. This flag $FLAG_{FB}$ is set equal to 1 during the first execution of a feedback sub-routine (a step 180). Thus, prior to initiation of the feedback sub-routine (between the moments $t_{13}$ and $t_{14}$, the open loop control is effected by executing a loop formed by steps 176, 177, 178, 179, 171, 172, and 174.

At the step 177, a target derivative $NTd_t$ is calculated using the following equation, $$NTd_t = NTd_3 - NTd_3 \times (C_2/C_3).$$

This equation is illustrated in FIG. 13 by a straight broken line A extending from the point $NTd_3$ toward zero. Since the open loop control of the pressure $P_H$ for the apply element B/B continues, the derivative NTd becomes equal to or less than the target derivative $NTd_3$ at a moment $t_{14}$.

At the step 178 following the step 177, it is determined whether or not the derivative NTd is less than or equal to the target derivative $NTd_t$. Between the moments $t_{13}$ and $t_{14}$, a deviation (error) between the target derivative $NTd_t$ and the actual derivative NTd is calculated and the integrated value $S_1$ is increased by the deviation calculated at the step 179. The integrated value $S_1$ indicates the amount of energy illustrated by an area of the shadowed zone between the moments $t_{13}$ and $t_{14}$ in FIG. 13. This integrated value $S_1$ is used in determining a target derivative, with respect to time, of input shaft revolution speed used in a feedback (F/B) control which is initiated after the moment $t_{14}$. The target derivative which is set in the feedback control in such a manner that an area of a shadowed zone after the moment $t_{14}$ becomes substantially equal to the area of the shadowed zone before the moment $t_{14}$ in FIG. 13.

Figure 12:
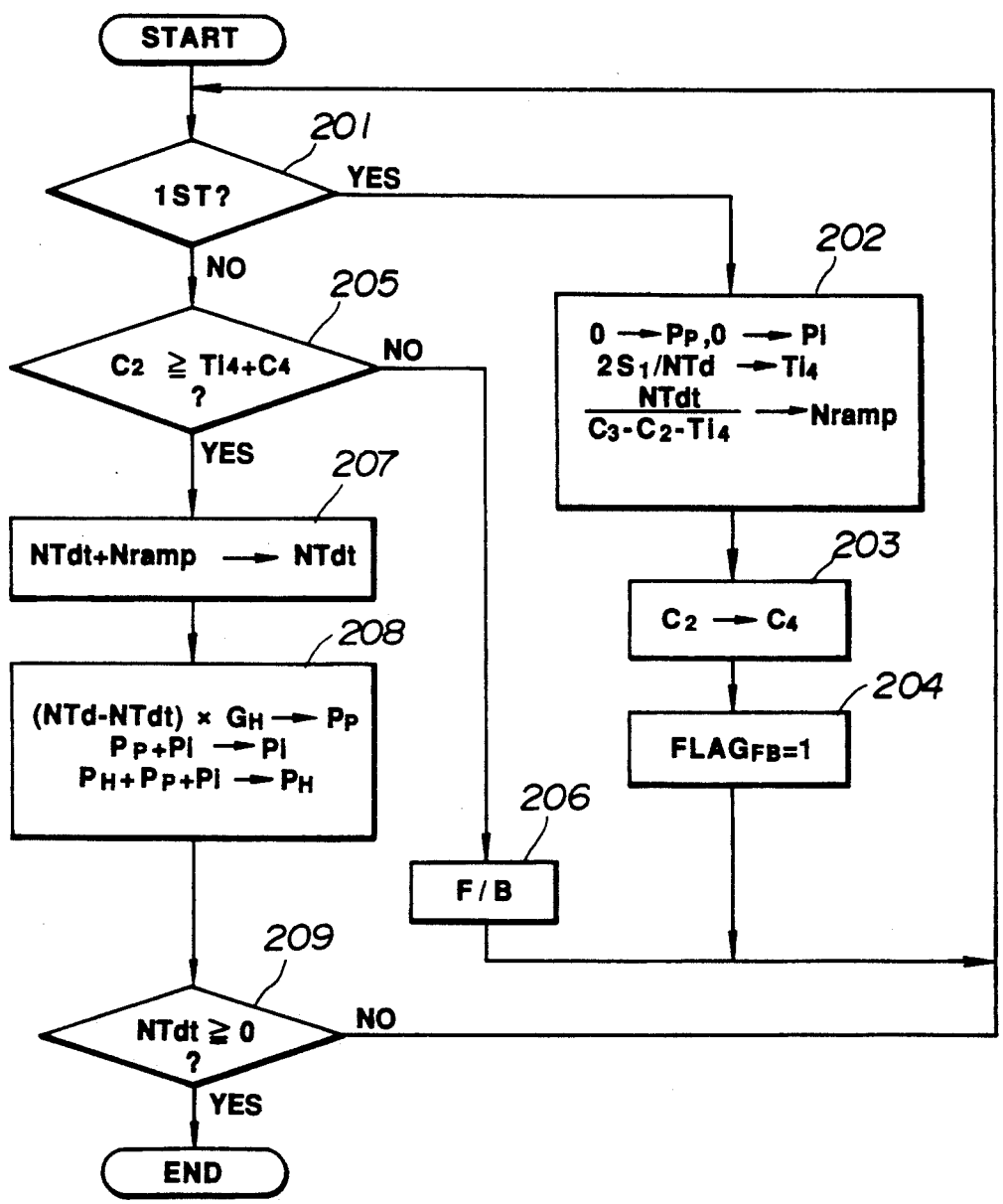

At the moment $t_{14}$ when it is determined at the step 178 that NTd becomes lower than the target value $NTd_1$, the program proceeds to a step 180 where a feedback control sub-routine shown in FIG. 12 is initiated. Since the flag $FLAG_{FB}$ is set equal to 1 upon initiating the execution of the sub-routine shown in FIG. 12, the steps 177 and 178 are skipped in the subsequent cycle.

In FIG. 12, if it is determined at a step 201 that the present cycle is the first occurrence, the program proceeds to steps 202, 203 and 204. At the step 202, a proportional term Pp and an integral term Pi are set equal to zero, respectively. Using the integrated value $S_1$ and the absolute value of NTd obtained at the moment $t_{14}$ (=NTdt), a timer value $T_{14}$ as expressed by the following equation is given, $$T_{i4} = 2 \times Si/NTd$$

where, NTd is the absolute value.

Using this timer value $T_{i4}$, a ramp value Nramp is given by the following equation, $$Nramp = NTd_t/(C_3 - C_2 - T_{i4}).$$

In this equation, the content of the counter $C_2$ is indicative of a period of time between $t_{13}$ and $t_{14}$, namely a delay till the initiation of the feedback control. The timer value $T_{i4}$ is indicative of a period of time between $t_{14}$ and $t_{15}$ during which the target value is kept constant. Thus, the term $C_3 - C_2 - T_{i4}$ is indicative of a period of remaining time between $t_{15}$ and $t_{16}$. The ramp value Nramp, therefore, is indicative of a rate of increase of the target derivative. This value Nramp is used in calculation in a step 207.

After the step 202, the program proceeds to the step 203 where the content of the second counter $C_2$ is set as the content of the fourth counter $C_4$ and then to the step 205 where the flag $FLAG_{FB}$ is set equal to 1. The fourth counter $C_4$ is used in a step 205 since it is indicative of a period of time between $t_{13}$ and $t_{14}$.

The program proceeds from the step 201 to the step 205 in the second cycle and onwards. At the step 205, it is determined whether or not the second counter $C_2$, which is incremented at the step 174 in FIG. 11, is equal to or greater than the sum $T_{i4} + C_4$. If the period of time $T_{i4}$ is not yet expired, the program proceeds to a step 206 where a feedback control of $P_H$ is effected in a direction as to decrease a deviation between $NTd_t$ and NTd toward zero. Thus, during the period of time between $t_{14}$ and $t_{15}$, the derivative NTd is kept at $NTd_t$ which is constant during this period of time. After expiration of this period of time between $t_{14}$ and $t_{15}$, namely after the moment $t_{15}$, the program proceeds from the step 205 to the step 207 where the target derivative $NTd_t$ is incremented by the ramp value Nramp, and then to a step 208 where a feedback control (PI control) of the pressure $P_H$ is effected to reduce a deviation between $NTd_t$ which has been incremented at the step 207 and the actual derivative NTd towards zero. Specifically, at the step 208, a proportional term Pp is given by calculating $(NTd-NTd_t) \times G_H$, an integral term is given by calculating Pp+Pi, and the pressure $P_H$ is incremented by Pp+Pi. Thus, after the moment $t_{14}$, the actual derivative NTd is adjusted to trace the broken line having a gradient indicated by the ramp value Nramp. At a step 209, it is determined whether or not the target derivative $NTd_t$ becomes equal to or greater than zero. If the sign of the target derivative $NTd_t$ is kept negative, the inquiry at the step 209 results in negative and thus the feedback control at the step 208 continues. If the inquiry at the step 209 results in affirmative, the feedback control is completed.

Returning to FIG. 11, after completion of the subroutine at the step 180, the program proceeds to a step 181 where it is determined whether or not the gear ratio $g_r$ becomes equal to or less than a gear ration $g_{rmin}$ for the second gear. At a moment $t_{16}$ when the gear ratio $g_r$ drops to $g_{rmin}$, the program proceeds to a step 182 where the pressure $P_H$ is set equal to the maximum pressure Pmax (as high as line pressure) and the flag $FLAG_{FB}$ is reset. The complete engagement of the band brake B/B is attained.

In FIG. 11, if the inquiry at the step 175 results in affirmative before the gear ratio $g_r$ does not yet drop to $g_{rmin}$, the target derivative $NTd_t$ is set equal to zero, and $P_H$ is set equal to Pmax at the step 182. Thus, if the gear ratio $g_r$ fails to drop to $g_{rmin}$ during the predetermined period of time as indicated by the counter $C_3$ beginning with the moment $t_{13}$, the apply element B/B is completely engaged immediately after expiration of this period of time (at the moment $t_{16}$).

From the preceding description of the embodiments according to the present, it will be appreciated that the release element is controlled to allow a small degree of engine speed increase. Since the degree of engine speed increase is prevented from exceeding a predetermined degree, the engine is prevented from racing during shifting. Since the apply element may become engaged at any time while the engine speed increase is allowed during the release process of the release element, it is always possible to select an appropriate engagement timing of the apply element.

What is claimed is:

1. A method of a shift control in an automatic transmission drivingly coupled with an engine, the automatic transmission including an input shaft drivingly coupled with the engine, an apply element, and a release element, the automatic transmission effecting shifting by releasing the release element and engaging the apply element, the method comprising the steps of:

releasing the release element in such a manner as to allow an increase in the input shaft speed within a predetermined degree for a period of time;

engaging the apply element during said period of time, wherein the release element is released in such a manner as to reduce a deviation between an actual value of a gear ratio and a target value of the gear ratio toward zero, and a gear ratio larger than a gear ratio corresponding to a gear position before the shifting is set as said target value to allow said increase in the input shaft speed.

2. A method of a shift control in an automatic transmission drivingly coupled with an engine, the automatic transmission including an input shaft drivingly coupled with the engine, an apply element, and a release element, the automatic transmission effecting shifting by releasing the release element and engaging the apply element, the method comprising the steps of:

releasing the release element in such a manner as to allow an increase in the input shaft speed with a predetermined degree for a period of time;

engaging the apply element during said period of time, wherein the release element is released in such a manner as to reduce a deviation between an actual value of a derivative of the input shaft revolution speed, and a target value of the derivative toward zero.

3. A method as claimed in claim 2, wherein the engagement of the apply element during the inertia phase is controlled in such a manner as to bring said actual value toward said target value, and said target value is variable as the inertia phase progresses.

4. In a shift control for an automatic transmission drivingly coupled with an engine, the automatic transmission including an input shaft drivingly coupled with the engine, an apply element, and a release element, the automatic transmission effecting shifting by initiating engagement of the apply element during release of the release element, a method of controlling engagement of the apply element, comprising the steps of:

determining a revolution speed of the input shaft and generating a revolution speed indicative signal indicative of said revolution speed detected;

determining a derivative of said input shaft revolution speed indicative signal and generating an actual derivative indicative signal indicative of said derivative determined;

repeating increment of a target derivative value after a first moment when said actual derivative indicative signal fails to be greater than a first predetermined value, said target derivative value being increased from a second predetermined value that is lower than said first predetermined value;

executing an open loop control after said first moment to a second moment when said actual derivative indicative signal fails to be greater than said target derivative value, said open loop control being such that a hydraulic fluid pressure applied to the apply element is increased toward a predetermined hydraulic pressure level at which the apply element is in a slidable engagement state;

keeping said target derivative value unchanged for a predetermined period of time after said second moment and resuming increment of said target derivative value after elapse of said predetermined period of time; and executing a feedback control after said second moment, said feedback control being such that the hydraulic fluid pressure applied to the apply element is controlled in such a direction as to decrease a deviation of said actual derivative indicative signal from said target derivative value toward zero.

5. A method as claimed in claim 4, further comprising the steps of:

integrating a deviation of said actual derivative indicative signal from said target derivative value over a time from said first moment to said second moment and generating an integration indicative of a result of integrating said deviation; and determining said predetermined period of time based on said integration indicative signal.

6. A method as claimed in claim 5 wherein said step of resuming increment of said target derivative value after elapse of said predetermined period of time includes sub-steps of:
- determining a ramp value based on a magnitude of said target derivative established at said second moment; and
- repeating increment of said target derivative value by said ramp value.

7. In a shift control for an automatic transmission drivingly coupled with an engine, the automatic transmission including an input shaft drivingly coupled with the engine, an apply element, and a release element, the automatic transmission effecting shifting by initiating engagement of the apply element during release of the release element, a method of controlling engagement of the apply element, comprising the steps of:
- determining a revolution speed of the input shaft and generating a revolution speed indicative signal indicative of said revolution speed detected;
- determining a derivative of said input shaft revolution speed indicative signal and generating an actual derivative indicative signal indicative of said derivative determined;
- scheduling a target derivative value variable with respect to time;
- executing an open loop control after a first moment when said actual derivative indicative signal fails to be greater than a first predetermined value to a second moment when said actual derivative indicative signal fails to be greater than said target derivative value, said open loop control being such that a hydraulic fluid pressure applied to the apply element is increased toward a predetermined hydraulic pressure level at which the apply element is in a slidable engagement state; and
- executing a feedback control after said second moment, said feedback control being such that the hydraulic fluid pressure applied to the apply element is controlled in such a direction as to decrease a deviation of said actual derivative indicative signal from said target derivative value toward zero.

8. A method of a shift control for an automatic transmission drivingly coupled with an engine, the automatic transmission including an input shaft drivingly coupled with the engine, an apply element, and a release element, the automatic transmission effecting shifting by initiating engagement of the apply element during release of the release element, the method comprising the steps of:
- determining a revolution speed of the input shaft and generating a revolution speed indicative signal indicative of said revolution speed detected;
- determining a derivative of said input shaft revolution speed indicative signal and generating an actual derivative indicative signal indicative of said derivative determined;
- executing a first feedback control wherein a hydraulic fluid pressure applied to the release element is controlled in such a direction as to reduce a deviation between said actual derivative indicative signal and a first predetermined value toward zero;
- executing increment of a hydraulic fluid pressure applied to the apply element until a first moment when said actual derivative indicative signal fails to be greater than a second predetermined value that is less than said first predetermined value;
- repeating increment of a target derivative value after said first moment, said target derivative value being increased from a third predetermined value that is less than said second predetermined value;
- executing an open loop control after said first moment to a second moment when said actual derivative indicative signal fails to be greater than said target derivative value, said open loop control being such that hydraulic fluid pressure applied to the apply element is increased toward a predetermined hydraulic pressure level at which the apply element is in a slidable engagement state;
- keeping said target derivative value unchanged for a predetermined period of time after said second moment and resuming increment of said target derivative value after elapse of said predetermined period of time; and
- executing a feedback control after said second moment, said feedback control being such that the hydraulic fluid pressure applied to the apply element is controlled in such a direction as to decrease a deviation of said actual derivative indicative signal from said target derivative value toward zero.

* * * * *